(12) United States Patent
Kim

(10) Patent No.: US 7,558,285 B2
(45) Date of Patent: Jul. 7, 2009

(54) DATA PROCESSING SYSTEM AND DATA INTERFACING METHOD THEREOF

(75) Inventor: Byoung-Woon Kim, Suwon-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 654 days.

(21) Appl. No.: 11/340,706

(22) Filed: Jan. 27, 2006

(65) Prior Publication Data
US 2006/0171413 A1    Aug. 3, 2006

(30) Foreign Application Priority Data
Feb. 3, 2005    (KR) .................. 10-2005-0010064

(51) Int. Cl.
*H04J 3/16*    (2006.01)
*H04J 3/06*    (2006.01)
*G06F 15/16*    (2006.01)

(52) U.S. Cl. .................. 370/466; 370/469; 370/503; 709/248

(58) Field of Classification Search ......... 370/465–469; 709/248–249
See application file for complete search history.

(56) References Cited

U.S. PATENT DOCUMENTS 6,304,936 B1    10/2001    Sherlock 7,250,797 B1 *    7/2007    Lawson .................. 327/144
7,366,803 B1 *    4/2008    Gaither et al. .......... 710/54
7,366,938 B2 *    4/2008    Warren et al. .......... 713/400

FOREIGN PATENT DOCUMENTS

| JP | 10-254811 | 9/1998 |
|---|---|---|
| KR | 1999-50252 | 7/1999 |
| KR | 10-2003-0090073 | 11/2003 |

* cited by examiner

*Primary Examiner*—Tri H Phan
(74) *Attorney, Agent, or Firm*—Harness, Dickey & Pierce, P.L.C.

(57) ABSTRACT

A data processing system includes a data processing module and a data interface module. The data processing module may perform a data processing function and interface with other data processing systems using data packets having a first protocol format including actual data and control data. The data interface module may convert data packets having the first protocol format to data packets having a second protocol format, may output the data packets having the second protocol format to the data bus, may convert data packets having the second protocol format to data packets having the first protocol format, and may transfer the data packets having the first protocol format to the data processing module. The data processing system may be capable of processing both standardized actual data and control data for transferring the standardized actual data, and capable of simultaneously supporting an asynchronous interface and a synchronous interface.

31 Claims, 12 Drawing Sheets

DATA PROCESSING SYSTEM AND DATA INTERFACING METHOD THEREOF

PRIORITY STATEMENT

This application claims the benefit of priority to Korean Patent Application No. 2005-10064 filed on Feb. 3, 2005 in the Korean Intellectual Property Office, the entire contents of which are hereby incorporated by reference.

BACKGROUND OF THE INVENTION

1. Field of the Invention

Example embodiments of the present invention relate to a data processing system capable of operating in a synchronous mode and an asynchronous mode by processing data and control information as a data packet and a data processing method for receiving and transferring data.

2. Description of the Related Art

Recently, there have been developments in processes and systems for providing efficient network services between digital devices such as computer terminals, peripheral devices, communication devices and mobile communication systems.

These digital devices may include a computer system for data processing. The computer system may include a central processing unit (CPU) that performs various operations and controls important system operations, and a plurality of subsystems, e.g., a plurality of data processing systems, that may perform core functions associated with the CPU.

Each of the data processing systems may be coupled to each other with a point-to-point connection or a data bus. These data processing systems perform data packet transfers through the point to-point connection or the data bus. Further, these data processing systems may employ a first in first out (FIFO) method for data processes associated between the data processing systems at least partially because the FIFO method may be advantageous for performance evaluation, and may describe data flow between the data processing systems in view of a top layer.

FIG. 1 is a schematic diagram illustrating an example of a conventional data processing systems coupled according to a point-to-point configuration.

As shown in FIG. 1, a first data processing system 10, a second data processing system 20 and a third data processing system 30 may include a first FIFO 11, 21 and 31 for data inputs and a second FIFO for 12, 22 and 32 data outputs, respectively. The three data processing systems 10, 20 and 30 in FIG. 1 are coupled in a point-to-point configuration.

A first FIFO 11 for data inputs of a first data processing system 10 may be coupled to a second FIFO 22 for data outputs of a second data processing system 20 and may be coupled to a second FIFO 32 for data outputs of a third data processing system 30.

A first FIFO 21 for data inputs of the second data processing system 20 may be coupled to a second FIFO 12 for data outputs of the first data processing system 10, and may be coupled to the second FIFO 32 for data outputs of the third data processing system 30.

A first FIFO 31 for data inputs of the third data processing system 30 may be coupled to the second FIFO 12 for data outputs of the first data processing system 10, and may be coupled to the second FIFO 22 for data outputs of the second data processing system 20.

Each of the first FIFOs 11, 21 and 31 for data inputs may be directly coupled to each of the second FIFOs 12, 22 and 32 for data outputs. In a conventional point-to-point configuration using FIFOs, providing connection lines between the FIFOs and/or data processing systems increases in complexity as the number FIFOs and/or data processing systems increase. This is one disadvantage of the conventional point-to-point configuration as described above. Further, data processing systems coupled in a conventional point-to-point configuration require a data arbitration process to determine a source of a received and/or input data packet.

FIG. 2 is a block diagram illustrating conventional data processing systems coupled in a data bus configuration.

As shown in FIG. 2, a first data processing system 40, a second data processing system 50, and a third data processing system 60 may be coupled to one another through a data bus 70.

As compared with a conventional point-to-point configuration, the connection lines between three data processing systems shown in FIG. 2 are less complex.

Still further, a data arbitration process required for the three data processing systems 10, 20 and 30 in FIG. 1 may not required for the three data processing systems 40, 50 and 60 shown in FIG. 2 because a bus master may be equipped in one of the three data processing systems 40, 50 and 60. In light of the above, a data bus architecture as shown in FIG. 2 is implemented for most conventional computer systems.

Conventionally, data processing systems 40, 50 and 60 may include interface logic to interface with a data bus 70. However, if interface logic is mixed with data processing logic for a core function of data processing systems 40, 50 and 60, it may be difficult to perform error detection, maintenance, and/or reuse of the logic. Accordingly, an interface logic module may be configured separately from a core function of data processing systems 40, 50 and 60.

FIG. 3 is a block diagram illustrating a structure of a conventional data processing system shown in FIG. 2.

Referring to FIG. 3, a conventional data processing system may include a data processing module 42 for performing a core data processing function, and a data interface module 44 for interfacing the data processing module 42 with a data bus 70.

A data interface module 44 may include an interface control logic 45, a write FIFO 46 and a read FIFO 47. An interface control logic 45 may interface control data for data transfer between a data processing module 42 and/or a data bus 70. A write FIFO 46 may load data provided from a data processing module 42 and may output the loaded data using a FIFO method in response to a request from a data bus 70. A read FIFO 47 may load data provided from a data bus 70 and may output the loaded data using a FIFO method in response to a request from a data processing module 42.

Control data may include command data and/or state data that is associated with controls during data processing. Actual data may include target data and address data except the control data.

Conventionally, an interface between a data processing module 42 and an interface control logic 45 is not standardized at least in part because control data is not standardized in a conventional data processing system 40.

As logic compatibility is decreased, reusability is decreased and maintenance may become difficult.

Due at least in part to the above-described deficiencies in a conventional system of connecting a plurality of data processing systems as shown in FIG. 2, an operating speed of a data processing module 42 may depend on an operating speed of a data bus 70. A read FIFO 46 and/or a write FIFO 47 may perform a clock conversion, but an interface control logic 45 may not perform clock conversion due to a complex circuit structure of the interface control logic 45.

Accordingly, a data interface module 44 may use a clock CLK identical with a clock CLK of a data bus 70 due to structural features of the data interface module 44, and an operating speed of the data processing module 42 is downwardly adjusted to match the operating speed of the data interface module 44.

Accordingly, despite high performance capabilities of a data processing module 42, a data processing system 40 may not achieve full performance due at least in part to a downward adjustment of the operating speed of the data processing module 42.

A conventional data interface module 44 may be suitable for a synchronous interface, but is not suitable for an asynchronous interface.

Conventionally, when an operating speed of a data processing module 42 is different from an operating speed of a data bus 70, an extra device may be employed to support an asynchronous interface. For example, a bus wrapper may be added to a conventional data system for supporting an asynchronous interface between an output end of a data processing system 40 and a data bus 70. However, there is excessive interface overhead in a bus wrapper. In other words, because an interface protocol of a data processing system 40 is, in most cases, different from an interface protocol of a data bus 70, the bus wrapper simultaneously handles clock interfaces and protocol interfaces. Thus, a ratio of the overhead occurring in the bus wrapper may be increased.

SUMMARY OF THE INVENTION

Example embodiments of the present invention provides a data processing system capable of processing both standardized actual data and control data for transferring the standardized actual data, and capable of supporting an asynchronous interface and a synchronous interface.

Example embodiments of the present invention also provide a data interfacing method capable of efficiently performing associative operations between a data processing system and a data bus.

An example embodiment of the present invention provides a data processing system. The data processing system may include a data processing module configured to perform a data processing function and interface with other data processing systems using data packets having a first protocol format including actual data and control data for data transfer; and a data interface module coupled to a data bus and the data processing module, the data interface module configured to convert data packets having the first protocol format to data packets having a second protocol format, to output the data packets having the second protocol format to the data bus, to convert data packets having the second protocol format to data packets having the first protocol format, and to transfer the data packets having the first protocol format to the data processing module.

An example embodiment of the present invention provides a data processing system include a data processing module and a data interface module. The data interface module may include a write FIFO configured to sequentially store the data packets having the first protocol format received from the data processing module and to retrieve the stored data packets based on a first in first out (FIFO) method; a protocol interface coupled to the data bus, the protocol interface configured to convert data packets having the first protocol format into data packets having the second protocol format and to transfer the data packets having the second protocol format to the data bus, the protocol interface is further configured to convert data packets having the second protocol format received from the data bus into data packets having the first protocol format; and a read FIFO configured to sequentially store the data packets having the first protocol format received from the protocol interface and to retrieve the stored data packets based on the FIFO method to provide the retrieved data packets to the data processing module.

According to an example embodiment of the present invention, data packets having a first protocol format may include a packet head section where the control data are stored; and a data section where the actual data are stored. The packet head section may includes at least one of a packet length data section that represents a length of the data packet, a valid bit data section that represents a number of the valid data of the data packet, an access unit data section that represents an access unit of the data packet, an address modification data section that represents whether an address data where the data packet is stored is modified or not, a packet type data section that represents a format of the data packet and a packet identification (ID) section that represents an identification of the packet.

An example embodiment of the present invention provides a data interfacing method in a transmission mode. The data interfacing method may include outputting data packets having a first protocol format synchronized to a first clock, each of the data packets having the first protocol format including actual data and control data used for transferring the actual data; sequentially storing the outputted data packets having the first protocol format based on the first clock; retrieving the stored data packets based on a FIFO method under synchronization of a second clock; converting the retrieved data packets having the first protocol format into a data packets having a second protocol format; and transferring the converted data packets to a data bus under synchronization of the second clock.

An example embodiment of the present invention provides a data interfacing method in a reception mode. The data interfacing method may include converting data packets having a second protocol format into data packets having a first protocol format; outputting the data packets having the first protocol format under synchronization of a second clock that is an operating clock of the data bus; and sequentially storing the outputted data packets having the first protocol format under synchronization of the second clock; and retrieving the stored data packets under synchronization of a first clock.

BRIEF DESCRIPTION OF THE DRAWINGS

The above and other features and advantages of the present invention will become more apparent when described in detailed example embodiments thereof with reference to the attached drawings in which.

DESCRIPTION OF EXAMPLE EMBODIMENTS OF THE PRESENT INVENTION

Figure 1:
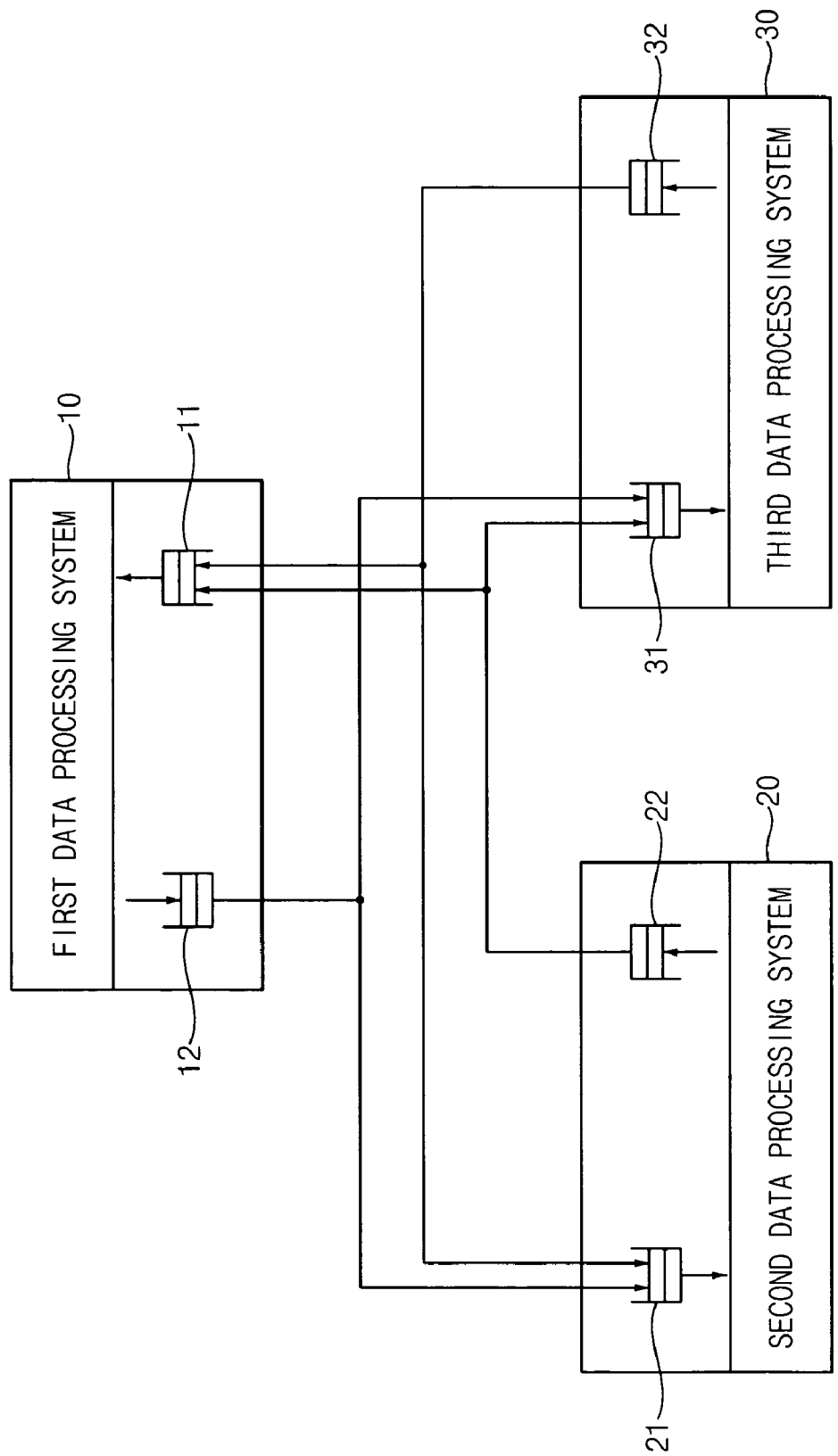
FIG. 1 is a schematic diagram illustrating conventional data processing systems coupled in a point-to-point configuration.
Figure 2:
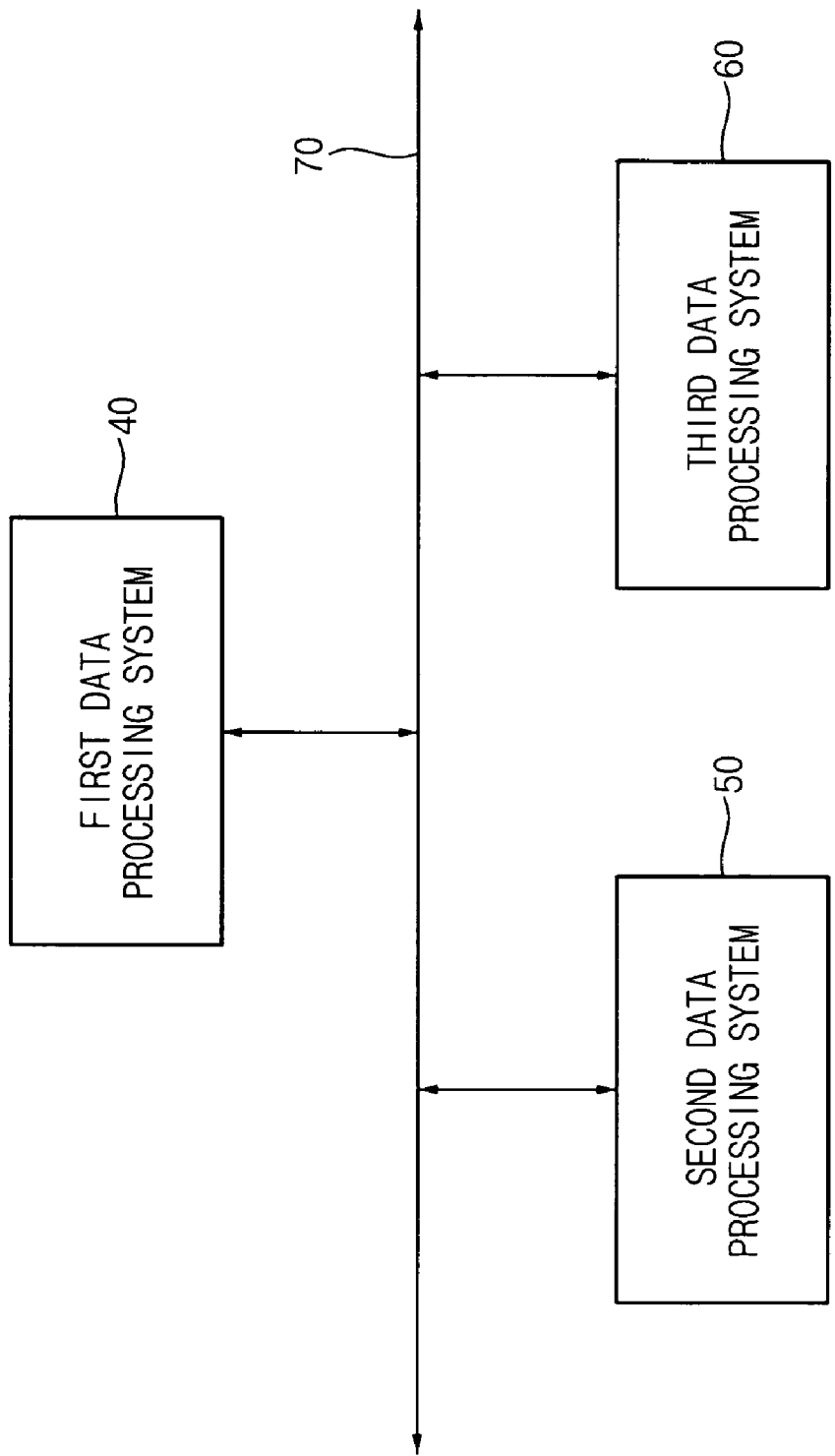
FIG. 2 is a block diagram illustrating conventional data processing systems coupled in a data bus configuration.
Figure 3:
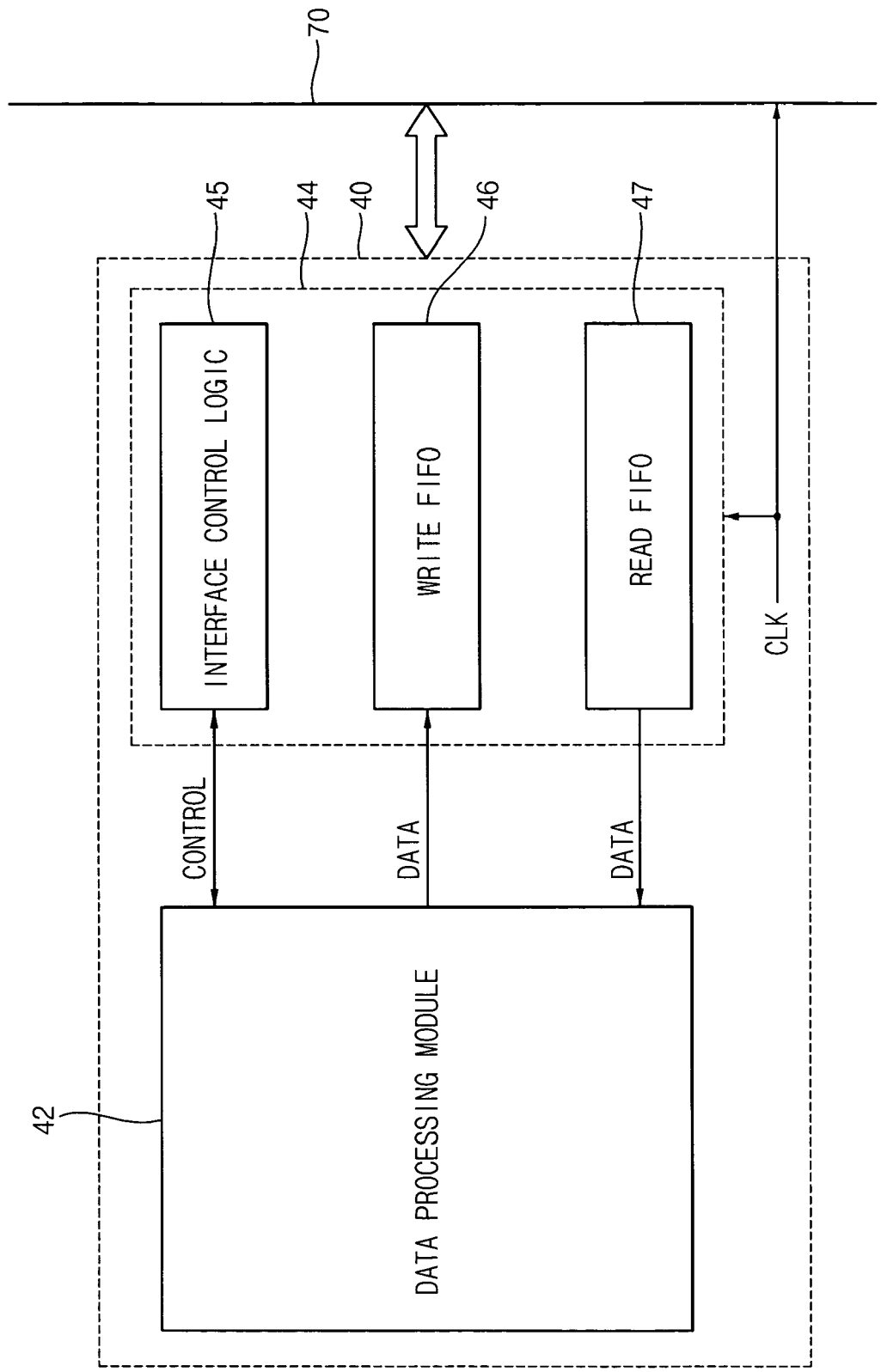
FIG. 3 is a block diagram illustrating a structure of a conventional data processing system.

Detailed example embodiments of the present invention are described herein. However, specific structural and/or functional details disclosed herein are merely representative for purposes of describing example embodiments of the present invention. This invention may, however, be embodied in many alternate forms and should not be construed as limited to the example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular example embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
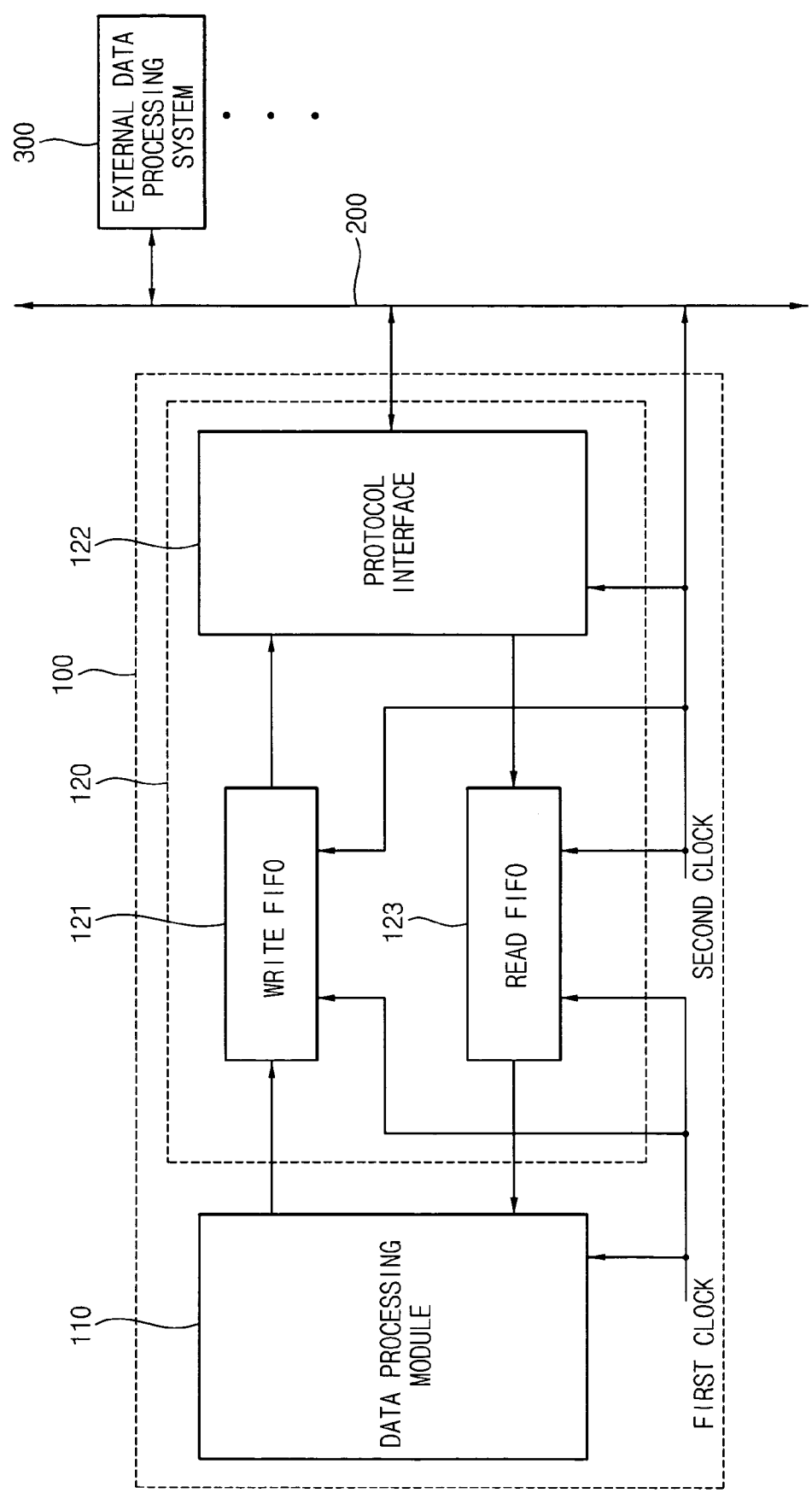
FIG. 4 is a block diagram illustrating a structure of a data processing system according to an example embodiment of the present invention.

FIG. 4 is a block diagram illustrating a structure of a data processing system 100 capable of supporting an asynchronous interface according to an example embodiment of the present invention.

Referring to FIG. 4, a data processing system 100 may include a data processing module 110 and a data interface module 120.

A data interface module 120 may include a write FIFO 121, a read FIFO 123 and a protocol interface 122.

A data processing module 110 may perform a core data processing function, may transfer data packets to a write FIFO 121 and may receive data packets from a read FIFO 123 through a data bus 200 to perform associative operations with another data processing system 300 coupled to the data bus 200.

The core data processing function refers to primary data processing performed by a data processing system 100. For example, a core function of an MPEG processing system may refer to a function for processing MPEG data.

A write FIFO 121 may sequentially store data packets received from a data processing module 110 and may output the stored data packets to a protocol interface 122 based on a FIFO method.

A write FIFO 121 may correspond to an asynchronous FIFO. That is, the write FIFO 121 may be synchronized to a first clock that corresponds to an operating clock of a data processing module 110 during a data packet input mode, and the write FIFO 121 may be synchronized to a second clock that corresponds to an operating clock of a data bus 200 and a protocol interface 122 during a data packet output mode.

A read FIFO 123 may sequentially store data packets received from a protocol interface 122 and may output the stored data packets to a data processing module 110 based on a FIFO method.

A read FIFO 123 may correspond to a synchronous FIFO. That is, the read FIFO 123 may be synchronized to a second clock that corresponds to an operating clock of a data bus 200 and a protocol interface 122 during a data packet input mode, and the read FIFO 123 may be synchronized to a first clock that corresponds to the operating clock of a data processing module 110 during a data packet output mode.

A protocol interface 122 may be coupled to a data bus 200, may convert a data packet having a first protocol format outputted from a write FIFO 121 to a data packet having a second protocol format suitable for a data bus 200 and may transfer the converted data packet having the second protocol format.

Further, a protocol interface 122 may convert a data packet having a second protocol format transferred from a data bus 200 to a data packet having a first protocol format, and may output the converted data packet having the first protocol format to a read FIFO 123.

For example, if a protocol interface 122 receives data packets having the first protocol format outputted from a write FIFO 121, the protocol interface 122 converts the data packet having the first protocol format into a data packet interface, and transfers the data packet interface to the read FIFO 123.

A data bus 200 may correspond to a standard interface bus, and a protocol interface 122 may ensure protocol compatibility between a data processing system 100 and the standard interface bus 200.

According to an example embodiment of the present invention, compatibility of a data processing system 100 with a data bus 200 may be improved by employing a protocol interface 122.

A data packet that may be transferred from a data processing module 110 and may be stored in a write FIFO 121, may then be transferred to a protocol interface 122. Further, a data packet that may be transferred from a protocol interface 122 and may be stored in a read FIFO 123, may then be transferred to a data processing module 100. Data packets according to an example embodiment of the present invention may include real data and control data for data transfer.

Figure 5:
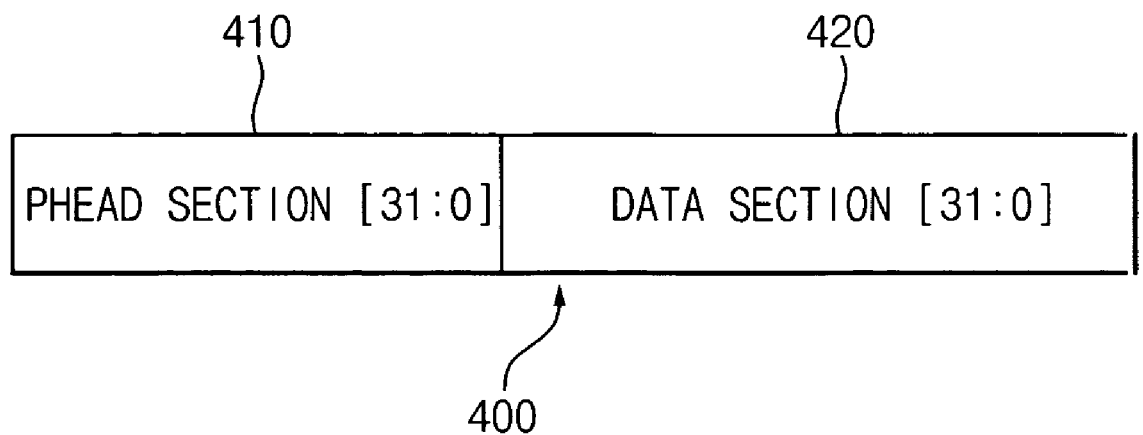
FIG. 5 is a schematic diagram illustrating a data packet structure used between a data processing module, FIFOs and a protocol interface shown in FIG. 4 in accordance with an example embodiment of the present invention.

FIG. 5 is a schematic diagram illustrating a data packet structure according to an example embodiment of the present invention that may be used between a data processing module 110, a write FIFO 121, a read FIFO 123 and a protocol interface 122 as shown in FIG. 4.

Referring to FIG. 5, a data packet 400 may include a packet head (PHEAD) section 410 having 32-bit control data, and a data section 420 having 32-bit real data, for example.

A data packet 400 according to an example embodiment of the present invention may include a plurality of the data sections 420 having a 32-bit space.

Figure 6:
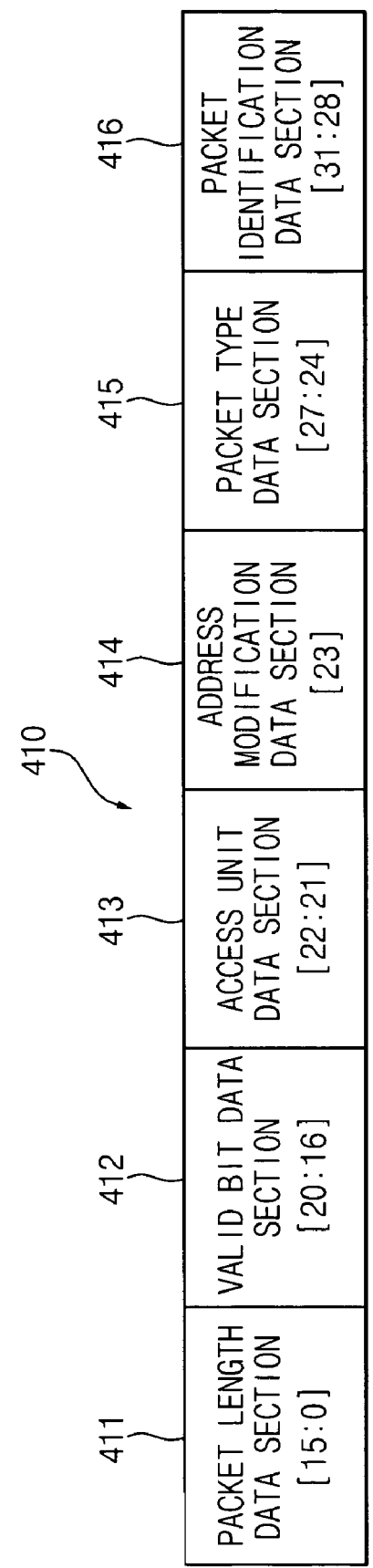
FIG. 6 is a schematic diagram illustrating a configuration of a packet head section of a data packet shown in FIG. 5 in accordance with an example embodiment of the present invention.

FIG. 6 is a schematic diagram illustrating an example configuration of a packet head section 410 of a data packet 400 shown in FIG. 5 according to an example embodiment of the present invention.

Referring to FIG. 6, sub-sections constituting a packet head section 410 may include one or more of the following.

1. A packet length data section 411 that may store packet length data and may occupy a first bit to a sixteenth bit [15:0] of the packet head section 410. Sixteen bits among a total of thirty-two bits constituting a packet head section 410 may be allocated for a packet length data section 411 of a packet head section 410, for example.

2. A valid bit data section 412 that may store a number of valid bits among a last word of 32-bit data stream 420, and may occupy a seventeenth bit to a twenty-first bit [20:16]. Five bits may be allocated for the valid bit data section 412 of the packet head section 410, for example.

3. An access unit data section 413 that may store data representing a corresponding access unit and may occupy from a twenty-second bit to a twenty-third bit [22:21]. Two bits may be allocated for the access unit data section 413 of the packet head section 410, for example. Further, an access unit may include a byte, a half word, and a word.

4. An address modification data section 414 that may store data representing whether a predetermined address is modified or not, and may occupy a twenty-fourth. bit [23]. One bit may be allocated for the address modification data section 414. For example, data representing whether the predetermined address is modified or not, may include either "no change" or "incremental change in address".

5. A packet type data section 415 that may store data representing a packet format and may occupy a twenty-fifth bit to a twenty-eighth bit [27:24]. Four bits may be allocated for the packet type data section 415, for example. Further, data representing the packet format may include either "read/write" or "critical access".

6. A packet identification data section 416 that may store data representing a packet ID and may occupy from a twenty-ninth bit to a thirty-second bit [31:28]. Four bits may be allocated for the packet ID data section 416, for example. Further, the packet ID data section 416 may be used as an extension field.

A packet structure according to an example embodiment of the present invention may be configured as follows.

For example, a data packet 400 for a single write operation, which is performed at the address "0x0010_8000" with the data "0x1234_5678", may the following configuration:

PHEAD 410: 411 (length=2), 412 (valid 32 bits), 413 (word), 414 (no change in address), 415 (write) and 416 (null)

D0 (DATA0): 0x0010_8000 (representing an address)

D1 (DATA1): 0x1234_5678 (representing data to be written).

As a second example, a data packet 400 for burst write operations, which are performed at the address "0x0010_8000" with the data "0x1234_5678" and at the address "0x0010_8004" with the data "0xaaaa_bbbb", may have the following configuration:

PHEAD 410: 411 (length=3), 412 (valid 32 bits), 413 (word), 414 (increment in address), 415 (write) and 416 (null)

D0 (DATA0): 0x0010_8000 (representing an address)

D1 (DATA1): 0x1234_5678 (representing a first data to be written)

D2 (DATA2): 0xaaaa_bbbb (representing a second data to be written).

The 'increment in address' of the address modification data section 414 according to this example uses an increment value four bits as a default value; thus, the first data "0x1234_5678" is written to the first address "0x0010_8000", and the second data "0xaaaa_bbbb" is written to the second address "0x0010_8004" where the default increment value four bits is applied.

According to an example embodiment of the present invention, a data packet 400 may include a packet head section 410, which may store control data in each of the sections 411 through 416 and a data section 420, which may store actual data to be written and the data address.

It should be noted that the above described data packet and/or data packet sections are described with respect to an example embodiment of the present invention and is not meant to be limiting.

Because both control data and real data may be transferred as a standardized data packet 400 between a write FIFO 121 and a read FIFO 123 according to an example embodiment of the present invention, an asynchronous interface of the write FIFO 121 and the read FIFO 123 is possible. Further, function boundaries between logics may be apparent and thus, reusability of each logic may be improved.

Figure 7:
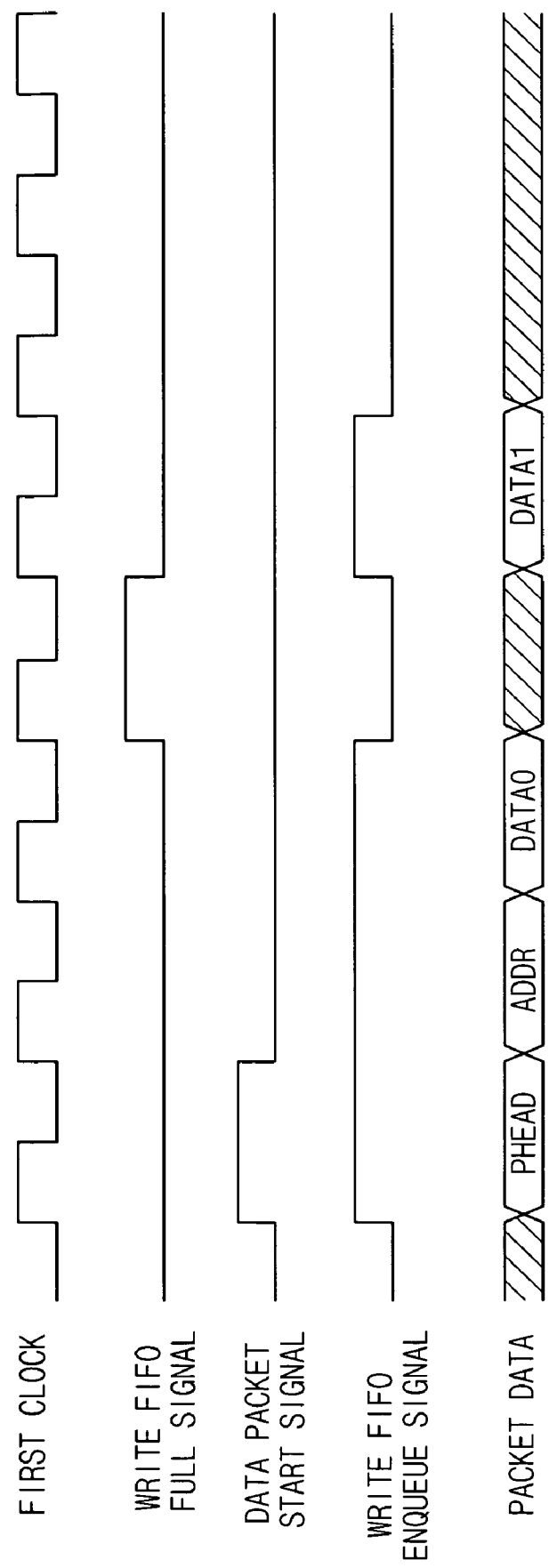
FIG. 7 is an example timing diagram for explaining a method according to an example embodiment of the present invention in which a data packet may be transferred from a data processing module and stored in a write FIFO.

FIG. 7 is an example timing diagram for explaining a method according to an example embodiment of the present invention in which a data packet may be transferred from a data processing module 110 shown in FIG. 4, and may be stored in a write FIFO 121. In FIG. 7, the following signals are shown in addition to a first clock signal.

1. A write FIFO enqueue signal. The write FIFO enqueue signal may be used for enabling a data packet to be stored in a write FIFO 121. For example, if a write FIFO enqueue signal is at a high level (e.g., an active level), contents of a data packet may be stored in a write FIFO 121.

2. A packet data signal. The packet data signal may represent contents of a data packet. As shown in FIG. 7, the packet data may include burst write operations, which are performed at the address "0x0010_8000" with the data "0x1234_5678" and at the address "0x0010_8004" with the data "0xaaaa_bbbb". The data packet signal illustrated in FIG. 7 includes PHEAD, D0, D1 and D2, wherein D0 represents an address, D1 represents first data DATA1 ("0x1234_5678") and D2 represents second data DATA2 ("0xaaaa_bbbb").

3. A data packet start signal. The data packet start signal may represent a start of a data packet.

4. A write FIFO full signal. The write FIFO full signal may be activated if a write FIFO 121 is full. For example, if a write FIFO full signal is at an active level, a write FIFO enqueue signal may not be permitted to become the active level. That is, a data packet cannot be stored in the write FIFO 121 if the write FIFO full signal is at the active level.

Referring to the example timing diagram in FIG. 7, while there is remaining storage space in a write FIFO 121, a write FIFO full signal is at a low level (e.g., a non-active level) and a data packet is transferred from a data processing module 110, the write FIFO enqueue signal experiences a state transition from a non-active level to the active level. As a result, a packet data including PHEAD, ADDR, DATA0 are sequentially stored in the write FIFO 121. Further, the data packet start signal experiences a state transition from the non-active level to the active level.

According to an example embodiment of the present invention, a data packet start signal may be used for initializing a finite state machine FSM (not shown) corresponding to each data packet. Further, if there are process errors on a previously inputted data packet, even though the current FSM remains at an undesired state, the present inputted data packet may be processed normally using the data packet start signal. Meanwhile, after DATA0 is stored in a write FIFO 121, when the write FIFO 121 is full, the write FIFO full signal experiences a state transition from the non-active level to the active level and an input process of the data packet is suspended. After a time period, when the write FIFO 121 is released from the full state, the write FIFO enqueue signal experiences a state transition from the non-active level to the active level thereby DATA1 of the packet data is inputted to the write FIFO 121.

According to the above-described operations of an example embodiment of the present invention, a data packet transferred from a data processing module 110 may be stored in a write FIFO 121.

As shown in the example timing diagram of FIG. 7, all of the signals may be synchronized to a first clock, which may be substantially identical with the operating clock of a data processing module 110.

Figure 8:
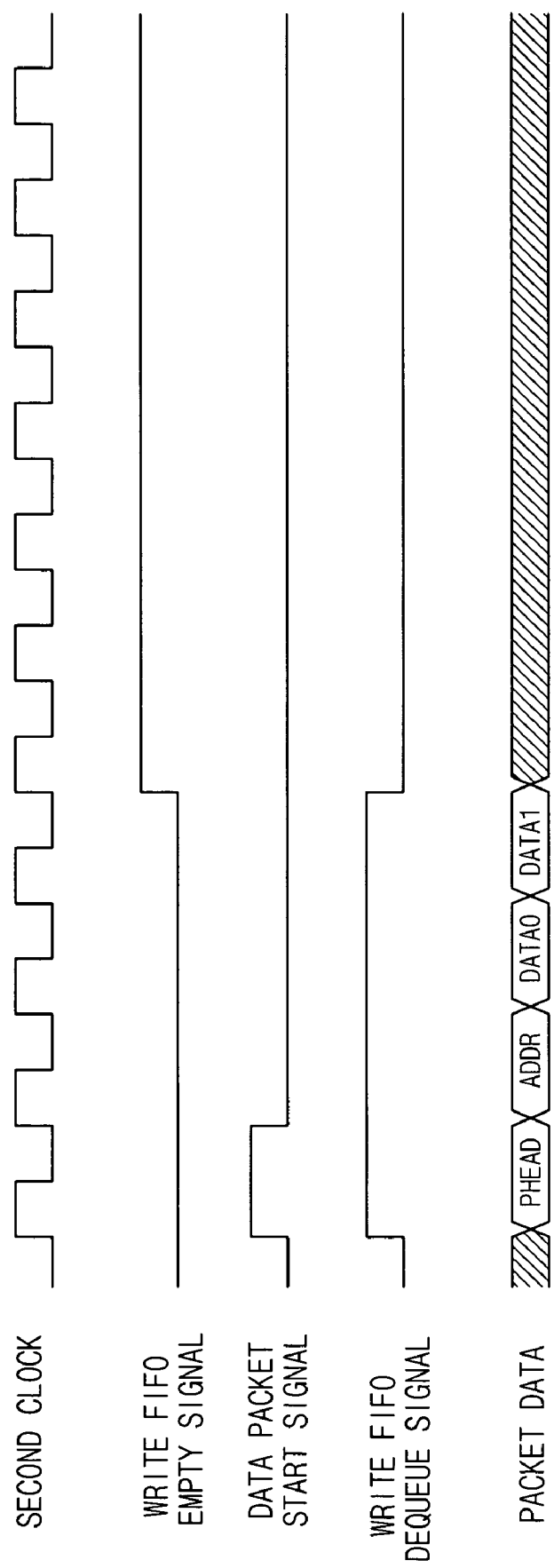
FIG. 8 is an example timing diagram for explaining a method according to an example embodiment of the present invention in which a data packet may be stored in a write FIFO and transferred to a protocol interface.

FIG. 8 is an example timing diagram for explaining a method according to an example embodiment of the present invention in which a data packet may be stored in a write FIFO 121 and may be transferred to a protocol interface 122, after the method shown in FIG. 7 is completed.

In FIG. 8, the following signals are shown in addition to the second clock signal.

1. A write FIFO dequeue signal. The write FIFO dequeue signal may be used for enabling a data packet to be retrieved from a write FIFO 121. For example, if a write FIFO dequeue signal is at an active level, contents of a data packet may be retrieved from a write FIFO 121.

2. A packet data signal. The packet data signal may represent contents of a data packet. Similar to the packet data shown in FIG. 7, the packet data of FIG. 8 may include burst write operations, which may be performed at an address "0x0010_8000" with data "0x1234_5678" and at an address "0x0010_8004" with data "0xaaaa_bbbb". The data packet shown in FIG. 8 includes PHEAD, D0, D1 and D2, wherein D0 represents an address, D1 represents first data DATA1 ("0x1234_5678") and D2 represents second data DATA2 ("0xaaaa_bbbb").

3. A data packet start signal. The data packet start signal may represent a start of a data packet.

4. A write FIFO empty signal. The write FIFO empty signal may be activated if a write FIFO 121 is empty. For example, if a write FIFO empty signal is at an active level, a write FIFO enqueue signal may not be permitted to become the active level since it is not possible to retrieve a data packet from a write FIFO 121.

Referring to the example timing diagram in FIG. 8, while there are stored data packets in a write FIFO 121, a write FIFO empty signal is at a non-active level and a retrieve request for data packet is received from a protocol interface 122, a write FIFO dequeue signal experiences a state transition from the non-active level to an active level and packet data including PHEAD, ADDR, DATA0 and DATA1 may be sequentially retrieved from the write FIFO 121. Further, a data packet start signal experiences a state transition from the non-active level to the active level.

As mentioned above, a data packet start signal may be used for performing data processing normally on a current inputted data packet even though a current FSM remains at an undesired state.

According to the above-described operations of an example embodiment of the present invention, data packets retrieved from a write FIFO 121 may be transferred to a protocol interface 122.

As shown in the example timing diagram of FIG. 8, all of the signals may be synchronized to a second clock, which may be substantially identical with an operating clock of a protocol interface 122.

Figure 9:
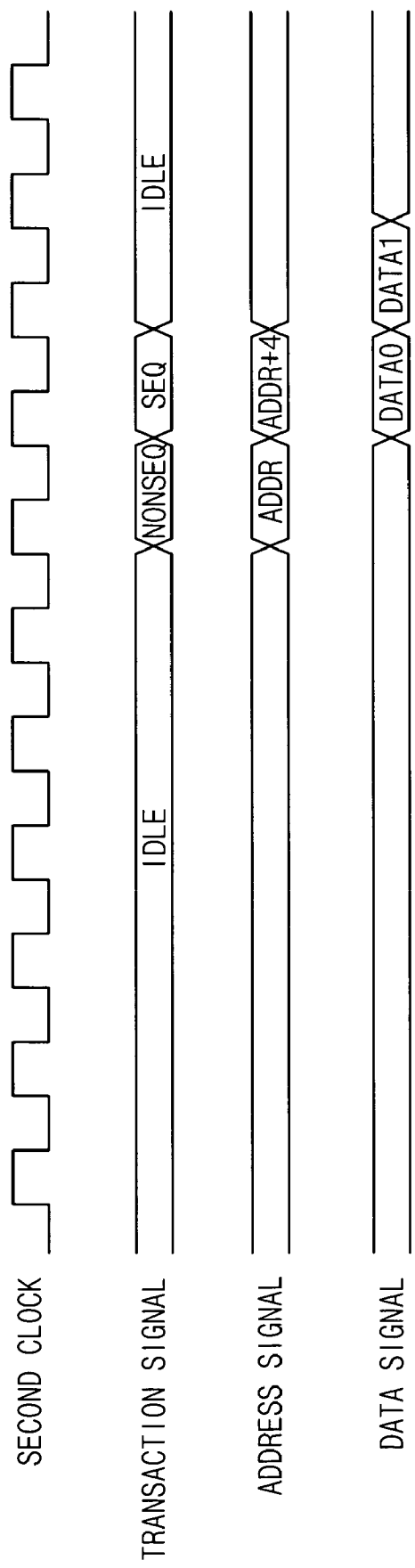
FIG. 9 is an example timing diagram for explaining a method according to an example embodiment of the present invention in which a data packet may be stored in a protocol interface and converted to output a converted data packet to a bus interface.

FIG. 9 is an example timing diagram for explaining a method according to an example embodiment of the present invention in which a data packet that may be stored in a protocol interface may be converted. The converted data packet may be output to a bus interface, after the method shown in FIG. 8 is completed.

Referring to FIG. 9, a data packet DATA0, which may be stored in a corresponding address ADDR, and a data packet DATA1, which may be stored in a corresponding address (ADDR+4), may be outputted from a protocol interface 122 to a data bus 200. When a transaction between a protocol interface 122 and a data bus 200 occurs, a transaction signal may be activated (e.g., in a non-idle state).

All of the signals shown in FIG. 9 may be synchronized to a second clock, which may be substantially identical with an operating clock of a protocol interface 122 and a data bus 200.

Figure 10:
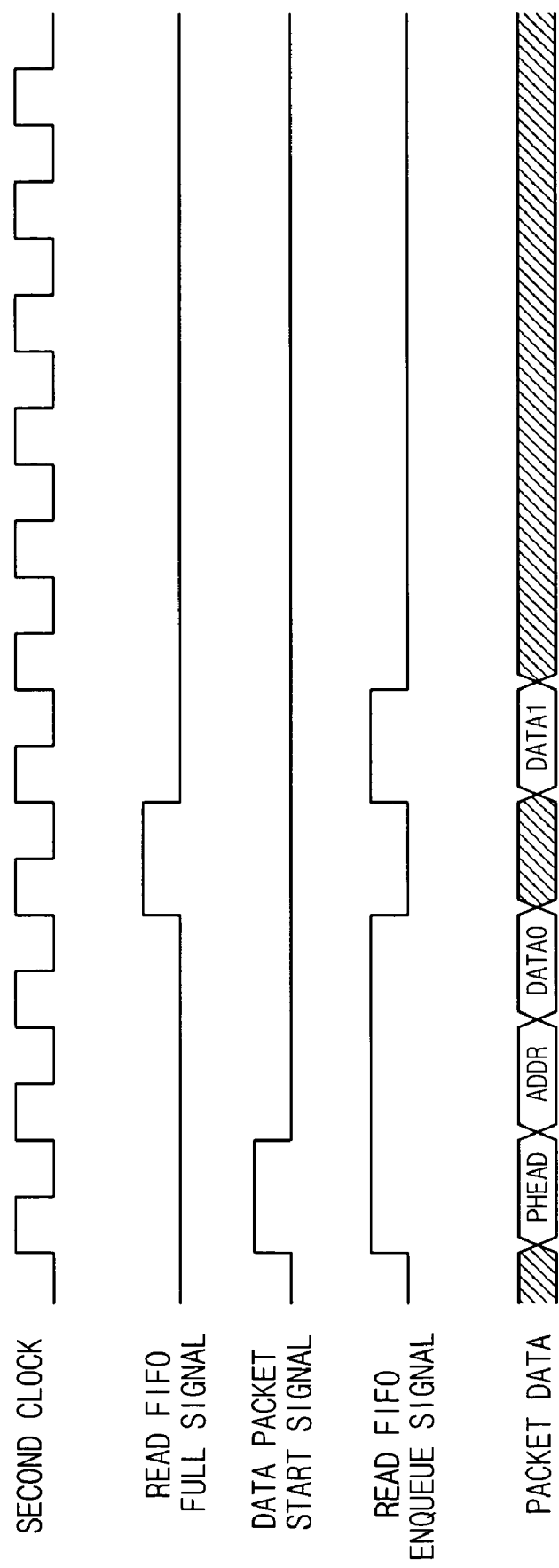
FIG. 10 is an example timing diagram for explaining a method according to an example embodiment of the present invention in which a data packet may be transferred from a protocol interface and stored in a read FIFO.

FIG. 10 is an example timing diagram for explaining a method according to an example embodiment of the present invention in which a data packet may be transferred from a protocol interface 122 shown in FIG. 4 and may be stored in a read FIFO 123. In FIG. 10, the following signals are shown in addition to a second clock signal.

1. A read FIFO enqueue signal. The read FIFO enqueue signal may be used for enabling a data packet to be stored in a read FIFO 123. For example, if a read FIFO enqueue signal is at a high level (e.g., an active level), contents of a data packet may be stored in a read FIFO 123.

2. A packet data signal. The packet data signal may represent contents of a data packet. As shown in FIG. 10, a packet data signal may include burst write operations, which may be performed at an address "0x0010_8000" with a data "0x1234_5678" and at an address "0x0010_8004" with a data "0xaaaa_bbbb". The data packet signal shown in FIG. 10 includes PHEAD, D0, D1 and D2, wherein D0 represents an address, D1 represents first data DATA1 ("0x1234_5678") and D2 represents second data DATA2 ("0xaaaa_bbbb").

3. A data packet start signal. The data packet start signal may represent a start of a data packet.

4. A read FIFO full signal. The read FIFO full signal may be activated when a read FIFO 123 is full. For example, if the read FIFO full signal is at an active level, a read FIFO enqueue signal is not permitted to become an active level. That is, a data packet cannot be stored in the read FIFO 123 if the read FIFO full signal is at the active level.

Referring to the example timing diagram in FIG. 10, while there is remaining storage space in a read FIFO 123, a read FIFO full signal is at a low level (e.g., non-active level) and a data packet may be transferred from a protocol interface 122, the read FIFO enqueue signal experiences a state transition from a non-active level to the active level. As a result, a packet data including PHEAD, ADDR, DATA0 are sequentially stored in the read FIFO 123. Further, the data packet start signal experiences a state transition from the non-active level to the active level.

According to an example embodiment of the present invention, a data packet start signal may be used for performing the data processing on a current inputted data packet normally even though a current FSM may remain an undesired state. Meanwhile, after DATA0 is stored in a read FIFO 123, when the read FIFO 123 is full, the read FIFO full signal experiences the state transition from the non-active level to the active level and an input process of the data packet is suspended. After a time period, when the read FIFO 123 is released from the full state, the read FIFO enqueue signal experiences a state transition from the non-active level to the active level and DATA1 of the packet data is inputted to the read FIFO 123.

According to the above-described operations of an example embodiment of the present invention, a data packet transferred from a protocol interface 122 may stored in a read FIFO 123.

As shown in the example timing diagram of FIG. 10, all of the signals may be synchronized to a second clock, which may be substantially identical with an operating clock of a protocol interface 122.

Figure 11:
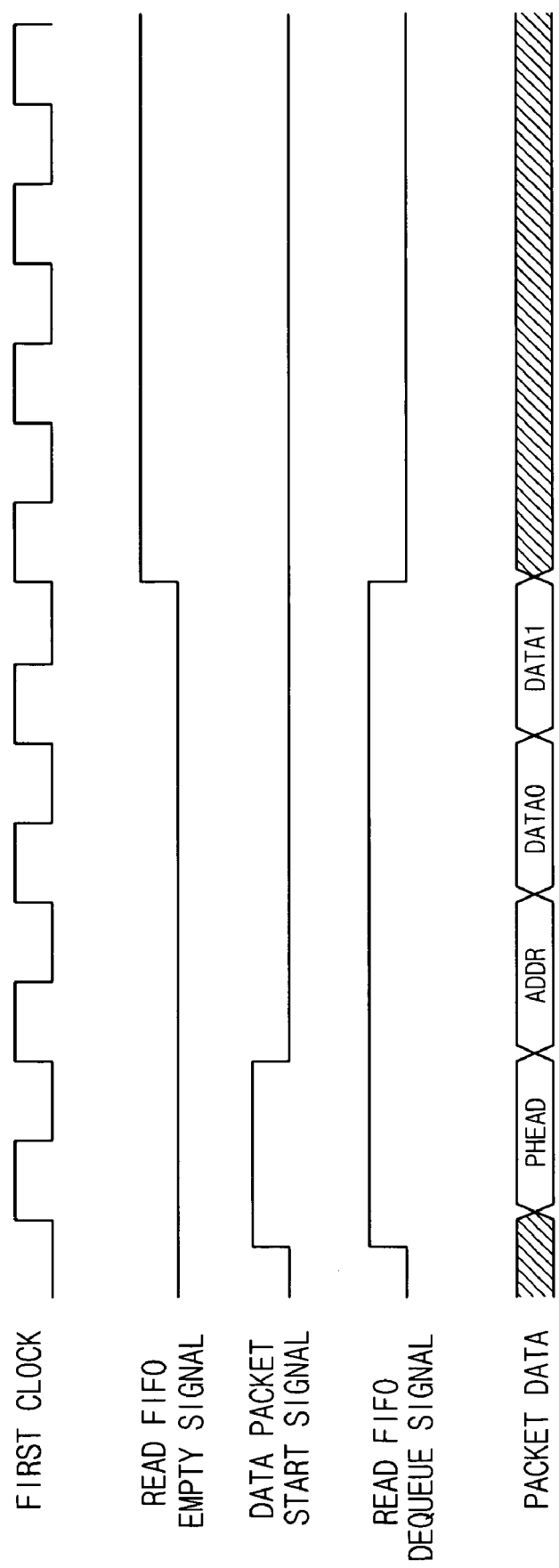
FIG. 11 is an example timing diagram for explaining a method according to an example embodiment of the present invention in which a data packet may be stored in a read FIFO transferred to a data processing module.

FIG. 11 is an example timing diagram for explaining a method according to an example embodiment of the present invention in which a data packet that may be stored in a read FIFO 123 may be transferred to a data processing module 110, after the method shown in FIG. 10 is completed. In FIG. 11, the following signals are shown in addition to the first clock signal.

1. A read FIFO dequeue signal. The read FIFO dequeue signal may be used for enabling a data packet to be retrieved from a read FIFO 123. For example, if the read FIFO dequeue signal is at an active level, contents of a data packet may be retrieved from a read FIFO 123.

2. A packet data signal. The packet data signal may represent contents of a data packet. Similar to the packet data signal shown in FIG. 11, the packet data of FIG. 8 may include burst write operations, which may be performed at an address "0x0010_8000" with data "0x1234_5678" and at an address "0x0010_8004" with data "0xaaaa_bbbb". The data packet signal shown in FIG. 11 includes PHEAD, D0, D1 and D2, wherein D0 represents an address, D1 represents first data DATA1 ("0x1234_5678") and D2 represents second data DATA2 ("0xaaaa_bbbb").

3. A Data packet start signal. The data packet start signal may represent a start of a data packet.

4. A read FIFO empty signal. The read FIFO empty signal may activate if a read FIFO 123 is empty. For example, if the read FIFO empty signal is at an active level, the read FIFO dequeue signal may not be permitted to become the active level because it is not possible to retrieve a data packet from the read FIFO 123.

Referring to the example timing diagram in FIG. 11, while there are stored data packets in a read FIFO 123, a read FIFO empty signal is at a non-active level, and if a retrieve request for a data packet is received from a data processing module 110, the read FIFO dequeue signal experiences a state transition from the non-active level to the active level. Accordingly, the packet data including PHEAD, ADDR, DATA0 and DATA1 may be sequentially retrieved from the read FIFO 123. Further, the data packet start signal experiences a state transition from the non-active level to the active level.

According to an example embodiment of the present invention, a data packet start signal may be used for performing the data processing on a current inputted data packet normally even though a current FSM may remains at an undesired state.

According to the above-described operations of an example embodiment of the present invention, data packets retrieved from a read FIFO 123 may be transferred to a data processing module 110.

As shown in the example timing diagram of FIG. 11, all of the signals may be synchronized to a first clock, which may be substantially identical with an operating clock of the data processing module 110.

According to an example embodiment of the present invention, a data processing system 100, a data processing module 110, a write FIFO 121, a read FIFO 123 and a protocol interface 122 perform associative operations using a common standardized data packet. Accordingly, each function between the data processing module 110, the write FIFO 121, the protocol interface 122 and the read FIFO123 included in the data processing system 100 may be separate from one another, thereby improving compatibility and reusability when replacement and maintenance of the above components of the data processing system 100 are desired and/or required.

Further, according to an example embodiment of the present invention, because an asynchronous write FIFO 121 and an asynchronous read FIFO 123 may use a substantially identical clock, the performance of a data processing module 110 may be independent from the performance of a data bus 200.

In an example embodiment of the present invention as shown in FIG. 4, a data processing module 110 and a data bus 200 may operate with a different operating clock. However, according to an example embodiment of the present invention as shown in FIG. 12, a data processing module 610 and a data bus 200 may share an operating clock.

Figure 12:
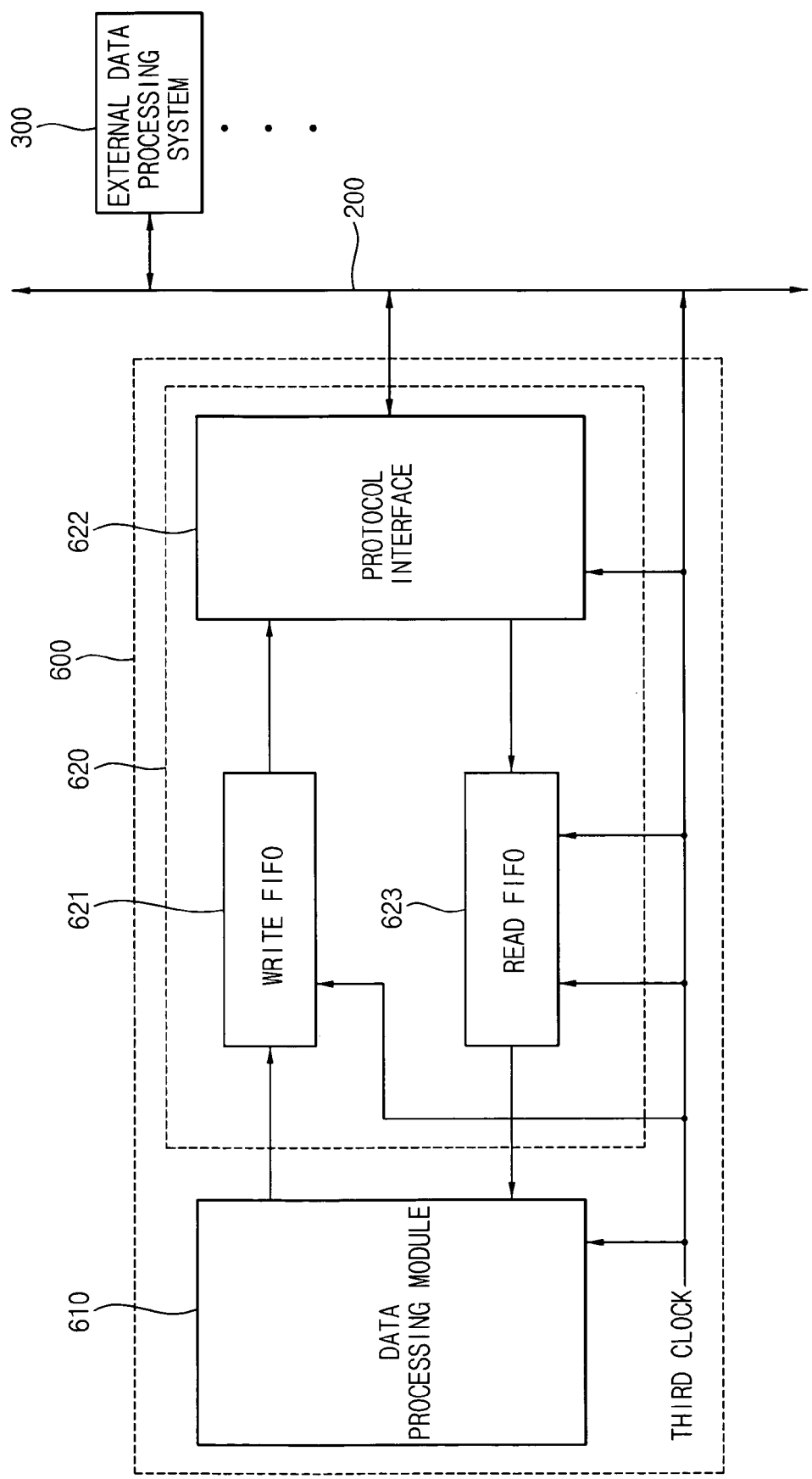
FIG. 12 is a block diagram illustrating a data processing system according to an example embodiment of the present invention.

Referring to FIG. 12, a data processing system 600 may include a data processing module 610 and a data interface module 620.

A data interface module 620 may include a write FIFO 621, a read FIFO 623 and a protocol interface 622. The write FIFO 621 and the read FIFO 623 shown in FIG. 12 are synchronous FIFOs. Accordingly, the data interface module 610, the write FIFO 621, the read FIFO 623, the protocol interface 622 and the data bus 200 may all operate with a common third clock.

According to an example embodiment of the present invention, an asynchronous interface and/or a synchronous interface may be selectively performed by alternating between an asynchronous FIFO and a synchronous FIFO.

According to example embodiments of the present invention, a data processing system may deal with a standardized data packet, which may include actual data and control data used for transferring the actual data. Therefore, a data processing system may have a simpler configuration in comparison with that of the conventional data processing system.

Further, according to example embodiments of the present invention, each function of components (for example, a data processing module, a read FIFO, a write FIFO and a protocol interface module) included in a data processing system is separate from one another, thereby improving reusability and compatibility of the components of the data processing system.

According to example embodiments of the present invention, a data processing system may implement both a synchronous interface and an asynchronous interface by alternating a FIFO. Accordingly, the data processing system may provide an improved and/or optimized network service by improving performance of a data processing module regardless of performance of a data bus.

While the example embodiments of the present invention and their advantages have been described in detail, it should be understood that various changes, substitutions and alterations may be made herein without departing from the scope of the invention.

What is claimed is:

1. A data processing system comprising:
a data processing module configured to perform a data processing function and interface with other data processing systems using data packets having a first protocol format including actual data and control data for data transfer; and
a data interface module coupled to a data bus and the data processing module, the data interface module configured to convert data packets having the first protocol format to data packets having a second protocol format, to output the data packets having the second protocol format to the data bus, to convert data packets having the second protocol format to data packets having the first protocol format, and to transfer the data packets having the first protocol format to the data processing module, wherein the data interface module includes,
a write FIFO configured to sequentially store the data packets having the first protocol format received from the data processing module and to retrieve the stored data packets based on a first in first out (FIFO) method,
a protocol interface coupled to the data bus, the protocol interface configured to convert data packets having the first protocol format into data packets having the second protocol format and to transfer the data packets having the second protocol format to the data bus, the protocol interface is further configured to convert data packets having the second protocol format received from the data bus into data packets having the first protocol format, and
a read FIFO configured to sequentially store the data packets having the first protocol format received from the protocol interface and to retrieve the stored data packets based on the FIFO method to provide the retrieved data packets to the data processing module.

2. The data processing system of claim 1, wherein the write FIFO and the read FIFO are each an asynchronous FIFO.

3. The data processing system of claim 2, wherein the write FIFO is synchronized to a first clock that is an operating clock of the data processing module to store the data packets and is synchronized to a second clock that is an operating clock of the protocol interface during an output of the stored data packets.

4. The data processing system of claim 2, wherein the read FIFO is synchronized to the second clock that is the operating clock of the protocol interface to store the data packet, and is synchronized to the first clock that is the operating clock of the data processing module during an output of the stored data packet.

5. The data processing system of claim 1, wherein the write FIFO and the read FIFO are each a synchronous FIFO.

6. The data processing system of claim 5, wherein the write FIFO, the read FIFO, the data processing module and the protocol interface are synchronized to an identical clock.

7. The data processing system of claim 6, wherein the clock is identical with an operating clock of the data bus.

8. The data processing system of claim 1, wherein the data interface module inputs the data packets having the first protocol format into the write FIFO if a write FIFO full signal is at a non-active level, and suspends input of the data packets having the first protocol format into the write FIFO if the write FIFO full signal is at an active level, the write FIFO full signal representing that the write FIFO has no more remaining storage space.

9. The data processing system of claim 1, wherein the data interface module inputs data packets having the first protocol format into the read FIFO if a read FIFO full signal is at a non-active level, and suspends input of the data packets having the first protocol format into the read FIFO if the read FIFO full signal is at an active level, the read FIFO full signal representing that the read FIFO has no more remaining storage space.

10. The data processing system of claim 1, wherein the data interface module retrieves data packets having the first protocol format from the write FIFO if a write FIFO empty signal is at a non-active level, and suspends the retrieving of the data packet data packets having the first protocol format from the write FIFO if the write FIFO empty signal is at an active level, the write FIFO empty signal representing that the write FIFO has no stored data.

11. The data processing system of claim 1, wherein the data interface module retrieves data packets having the first protocol format from the read FIFO if a read FIFO empty signal is at a non-active level, and suspends the retrieving of the data packet having the first protocol format if read FIFO empty signal is at an active level, the read FIFO empty signal representing that the read FIFO has no stored data.

12. The data processing system of claim 1, wherein each of the data packets having a first protocol format includes:
a packet head section where the control data are stored; and
a data section where the actual data are stored.

13. The data processing system of claim 12, wherein the packet head section is composed of about thirty-two bits.

14. The data processing system of claim 12, wherein the data section is composed of about thirty-two bits.

15. The data processing system of claim 12, wherein the data packet includes a plurality of the data sections.

16. The data processing system of claim 12, wherein the packet head section includes at least one of a packet length data section that represents a length of the data packet, a valid bit data section that represents a number of the valid data of the data packet, an access unit data section that represents an access unit of the data packet, an address modification data section that represents whether an address data where the data packet is stored is modified or not, a packet type data section that represents a format of the data packet and a packet identification (ID) section that represents an identification of the packet.

17. The data processing system of claim 16, wherein the packet length data section includes about sixteen bits, the valid bit data section includes about five bits, the access unit data section includes about two bits, the address modification data section includes about one bit, the packet type data section includes about four bits, and the packet ID data section includes about four bits.

18. The data processing system of claim 16, wherein the packet ID data section is used for an extension field.

19. The data processing system of claim 16, wherein the number of the valid data is counted with the last word of the data packet.

20. The data processing system of claim 16, wherein the access unit includes at least one of a byte, a half word and a word.

21. The data processing system of claim 12, wherein the input/output of the packet head included in the data packet is synchronized with a data packet start signal having an active level.

22. The data processing system of claim 21, wherein the data interface module initializes a finite state machine (FSM) corresponding to each of the data packets using the data packet start signal.

23. The data processing system of claim 1, wherein the actual data includes a target data and an address where the target data is stored.

24. The data processing system of claim 1, wherein the data bus is a standard interface bus.

25. The data processing system of claim 1, wherein the data processing function of the data processing module is a core data processing function of the data processing system.

26. A data interfacing method in a transmission mode, comprising:
   outputting data packets having a first protocol format synchronized to a first clock, each of the data packets having the first protocol format including actual data and control data used for transferring the actual data;
   sequentially storing the outputted data packets having the first protocol format based on the first clock;
   retrieving the stored data packets based on a FIFO method under synchronization of a second clock;
   converting the retrieved data packets having the first protocol format into a data packets having a second protocol format; and
   transferring the converted data packets to a data bus under synchronization of the second clock.

27. The data interfacing method of claim 26, wherein the first clock is different from the second clock.

28. The data interfacing method of claim 26, wherein the first clock is identical with the second clock.

29. A data interfacing method in a reception mode, comprising:
   converting data packets having a second protocol format into data packets having a first protocol format;
   outputting the data packets having the first protocol format under synchronization of a second clock that is an operating clock of the data bus; and
   sequentially storing the outputted data packets having the first protocol format under synchronization of the second clock; and
   retrieving the stored data packets under synchronization of a first clock.

30. The data interfacing method of claim 29, wherein the first clock is different from the second clock.

31. The data interfacing method of claim 29, wherein the first clock is identical with the second clock.

* * * * *